US012427594B2

(12) United States Patent
Maeda

(10) Patent No.: US 12,427,594 B2
(45) Date of Patent: Sep. 30, 2025

(54) TAP TOOL AND TAPPING METHOD

(71) Applicant: MAKINO MILLING MACHINE CO., LTD., Tokyo (JP)

(72) Inventor: Junichi Maeda, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 807 days.

(21) Appl. No.: 17/600,951

(22) PCT Filed: Mar. 31, 2020

(86) PCT No.: PCT/JP2020/014934
§ 371 (c)(1),
(2) Date: Oct. 1, 2021

(87) PCT Pub. No.: WO2020/204047
PCT Pub. Date: Oct. 8, 2020

(65) Prior Publication Data
US 2022/0161341 A1  May 26, 2022

(30) Foreign Application Priority Data
Apr. 4, 2019   (JP) .................. 2019-072308

(51) Int. Cl.
 *B23G 5/06* (2006.01)
 *B23G 1/18* (2006.01)
(52) U.S. Cl.
 CPC ............. *B23G 5/06* (2013.01); *B23G 1/18* (2013.01); *B23G 5/062* (2013.01); *Y10T 408/03* (2015.01); *Y10T 408/90467* (2015.01)
(58) Field of Classification Search
 CPC . B23G 5/18; B23G 5/06; B23G 5/062; B23G 2200/16; B23G 5/00; B23B 27/065;
(Continued)

(56) References Cited

U.S. PATENT DOCUMENTS 4,090,808 A * 5/1978 Nannen ............... B23G 5/06
 408/222
4,316,683 A * 2/1982 Schott ................. B23G 5/20
 470/198
(Continued)

FOREIGN PATENT DOCUMENTS

CN   102114592 A    7/2011
CN   109604747 A *  4/2019
(Continued)

OTHER PUBLICATIONS

Translation of FR 1451550, Janin, Threading tool such as tap and die, Jan. 7, 1966, pp. 3 (Year: 1966).*
(Continued)

*Primary Examiner* — Sunil K Singh
*Assistant Examiner* — Michael J Vitale
(74) *Attorney, Agent, or Firm* — Merchant & Gould P.C.

(57) ABSTRACT

The tap tool (10) has an axis of rotation (Cr) and machines a pilot hole (6') so that the same becomes a screw hole (6) in a state where the axis of rotation has been matched to a central axis (C6) of the pilot hole which is provided to a workpiece, wherein the tap tool (10) is characterized by being provided with: a thread section (14) having a blade section (14a) for machining a thread groove of the screw hole; pad sections (15, 16) located behind in a direction of rotation of the blade section, and engaging with the thread groove machined by the blade section during the machining of the thread groove; and a non-engagement section (17) for forming a space (20) between said section and the screw hole in a cross-sectional view where the axis of rotation and the central axis of the screw hole have been matched. The space has a size that enables simultaneous release of the engagement between the thread section and the thread groove and the engagement of the pad sections and the thread groove, in a case where the tap tool has shifted in a
(Continued)

direction orthogonal to the axis of rotation within the screw hole, such shift being from the state where the axis of rotation and the central axis of the screw hole have been matched.

7 Claims, 7 Drawing Sheets

(58) Field of Classification Search
CPC .............. B23C 2220/52; Y10T 408/03; Y10T 408/9046; Y10T 408/90467; Y10T 408/9048
See application file for complete search history.

(56) References Cited

U.S. PATENT DOCUMENTS

| | | | | |
|---|---|---|---|---|
| 5,318,393 | A | * | 6/1994 | Yamada .................. B23G 5/06 408/222 |
| 5,429,459 | A | * | 7/1995 | Palm .................. B23Q 11/0042 408/222 |
| 5,678,962 | A | | 10/1997 | Hyatt et al. |
| 2005/0271486 | A1 | * | 12/2005 | Henderer ................. B23G 5/06 408/222 |
| 2017/0297125 | A1 | * | 10/2017 | Schanz ................. B23B 51/101 |
| 2018/0133824 | A1 | * | 5/2018 | Meyer .................... B23G 5/005 |

FOREIGN PATENT DOCUMENTS

| | | | |
|---|---|---|---|
| DE | 102005022550.3 A1 | 3/2006 | |
| EP | 0237035 A2 | 9/1987 | |
| FR | 1451550 A * | 1/1966 | |
| JP | H03-184721 A | 8/1991 | |
| JP | 3457178 B2 * | 10/2003 | ............. B23G 5/005 |
| WO | WO-2009037094 A1 * | 3/2009 | ............... B23G 5/18 |

OTHER PUBLICATIONS

International Search Report for PCT/JP2020/014934 (Jul. 7, 2020).

* cited by examiner (Prior Art)

TAP TOOL AND TAPPING METHOD

This application is a National Stage Application of PCT/JP2020/014934, filed Mar. 31, 2020, which claims benefit of priority to Japanese Patent Application No. 2019-072308, filed Apr. 4, 2019, which applications are incorporated herein by reference. To the extent appropriate, a claim of priority is made to each of the above disclosed applications.

FIELD

The present invention relates to a tap tool for machining a pilot hole provided in a workpiece into a screw hole, and a tap machining method.

BACKGROUND

When tap machining is performed using a machining center and a tap tool mounted thereon, so-called "synchronous tap machining", in which rotation and linear feeding are synchronized, is performed. Synchronous tap machining also requires synchronization of rotation and feeding when withdrawing the tap tool from the machined screw hole. Thus, the time required for withdrawal of the tap tool is substantially equal to the time required to advance the tap tool and machine the threaded groove. A machining program creator selects a tool material suitable for the work material and optimizes the rotation speed of the spindle of the machining center in accordance with the torque characteristics of the spindle motor of the machining center and the diameter and depth of the screw hole in order to attempt to achieve a reduction of tap machining time in minute units of, for example, less than 1 second.

Patent Literature 1 discloses a tap tool (thread milling machine) used along with NC milling machines or machining centers. The tap tool of Patent Literature 1 is formed so as to enable not only tap machining but also the machining of pilot holes at the same time as tap machining in order to comprehensively reduce the machining time. Thus, the tap tool of Patent Literature 1 comprises a bottom blade for performing pilot hole machining and a tip, which is a blade section for tap machining, on the outer periphery of the tool. The tap tool has an outer diameter which is considerably smaller than the inner diameter of the screw hole to be machined, and tap machining is performed by rotating (turning) the tap tool about the spindle of the machine tool and revolving about the central axis of the screw hole.

CITATION LIST

Patent Literature

[PTL 1] Japanese Unexamined Patent Publication (Kokai) No. 03-184721

SUMMARY

Technical Problem

According to the tap tool of Patent Literature 1, since the outer diameter of the tap tool is smaller than the inner diameter of the screw hole, bending stress based on cutting resistance is generated in the tap tool during tap machining. As a result, there is a concern that the dimensional accuracy of the screw hole may be reduced due to deflection of the tap tool, in particular when the tap tool is elongate. Furthermore, since the tap machining of Patent Literature 1 is performed with one tip, it is expected that the tap machining time will increase as compared to the conventional tap tools of the prior art, and as a result, the effect on the conventional tap machining methods of the prior art is considered to be limited when compared in terms of machining time including pilot hole machining.

The present invention has been conceived in light of such circumstances, and an object of the present invention is to provide a tap tool with which tap machining can be performed in a short time while maintaining the same accuracy as the prior art.

Solution to Problem

In order to achieve the above object, according to the present invention, there is provided a tap tool which has an axis of rotation and which machines a pilot hole provided in a workpiece into a screw hole in a state in which a central axis of the pilot hole and the axis of rotation are aligned, the tap tool comprising a thread section having a blade section which machines a threaded groove of the screw hole, a pad section which is positioned rearward of the blade section in the direction of rotation and which engages with the threaded groove machined by the blade section during machining of the threaded groove, and a non-engagement section which forms a space between itself and the screw hole in a cross-sectional view in which the axis of rotation and the central axis of the screw hole are aligned, wherein the space has a size which enables simultaneous release of engagement between the thread section and the threaded groove and engagement between the pad section and the threaded groove when the tap tool shifts in the screw hole in a direction orthogonal to the axis of rotation from a state in which the axis of rotation and the central axis of the screw hole are aligned.

Further, according to the present invention, there is provided a tap machining method, comprising the steps of aligning an axis of rotation of a spindle of a machine tool on which a tap tool is installed and a central axis of a pilot hole provided in a workpiece, performing tap machining on the pilot hole by advancing the tap tool in the direction of the axis of rotation while rotating the tap tool, shifting the tap tool in a direction orthogonal to the axis of rotation of the spindle so as to release engagement between a thread section of the stationary tap tool, which has a blade section, and a threaded groove of a screw hole formed in the workpiece, and withdrawing the tap tool in the direction of the axis of rotation without rotating the tap tool.

Advantageous Effects of Invention

According to the present invention, after machining, it is possible to retract the tap tool, which has been moved in a direction orthogonal to the axis of rotation and for which engagement with the threaded groove of the screw hole has been released, from the screw hole in the direction of the axis of rotation at high speed without rotating the tap tool. Due to the effect of retracting at high speed, the machining time including the time for returning to the machining start point can be shortened.

Furthermore, according to the present invention, since the cutting resistance is supported by the screw hole via the pad section, the deflection which occurs in the tap tool based on the cutting resistance is negligible, and as a result, machining accuracy is similar to the case in which the conventional tap tool 210 of the prior art is used.

DESCRIPTION OF EMBODIMENTS

Figure 1:
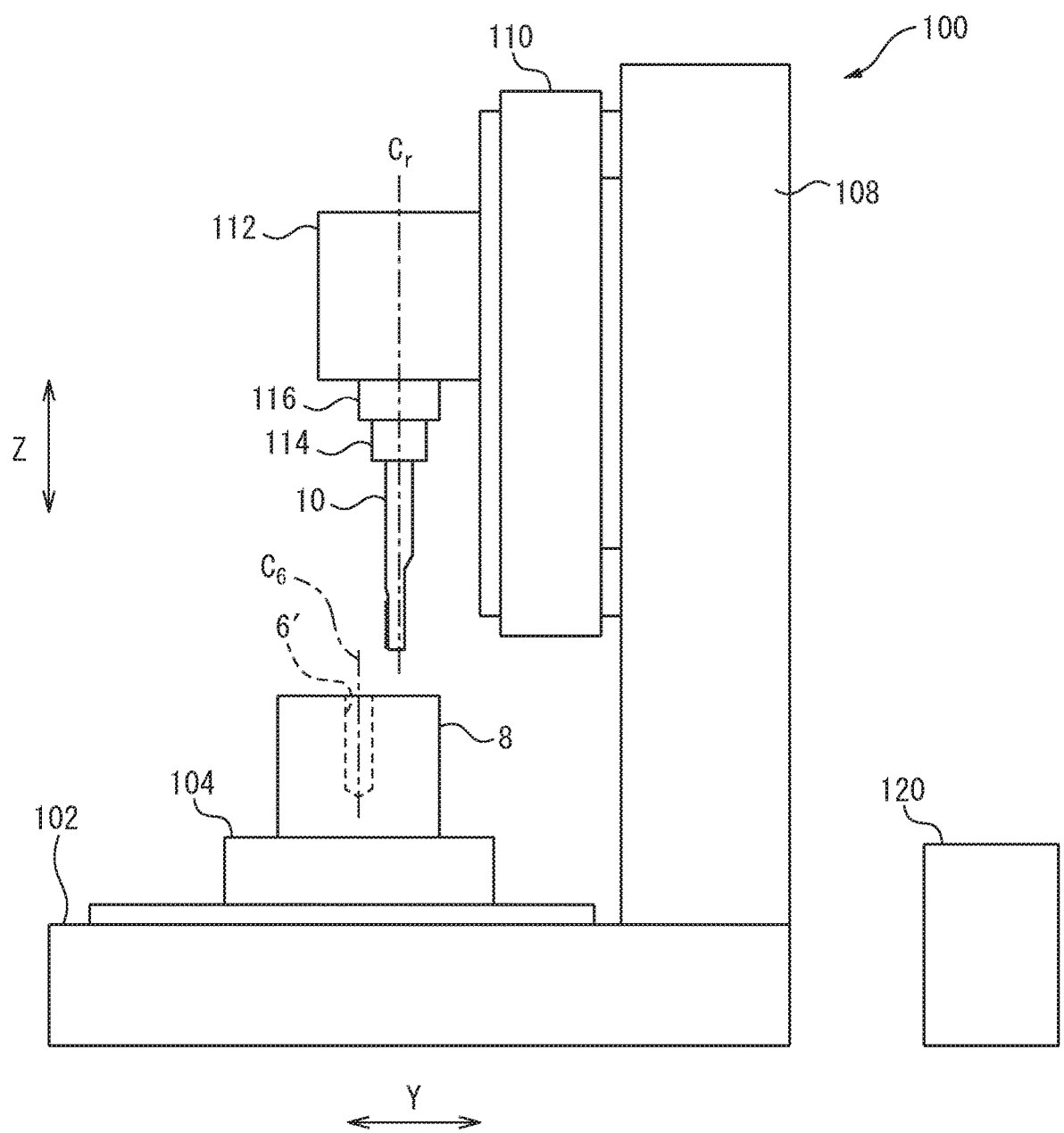
FIG. 1 is a front view of a machine tool and a tap tool according to an embodiment of the present invention mounted on a spindle head of the machine tool.

FIG. 1 is a diagram showing a machine tool 100, which is a conventional vertical machining center, and a tap tool 10 according to an embodiment of the present invention mounted on the machine tool 100. The machine tool 100 of FIG. 1 comprises a bed 102 serving as a base affixed to a floor of a factory, a Y-axis slider 104 which is provided on the upper surface of the bed 102 so as to be movable in the Y-axis direction and to which a workpiece 8 is clamped and affixed, a column 108 which stands on the upper surface of the bed 102, on the right side in FIG. 1, an X-axis slider 110 which is provided so as to be movable in the X-axis direction (the direction perpendicular to the sheet of FIG. 1) on the front surface of the column 108, a Z-axis slider 112 which is provided so as to be movable in the Z-axis direction relative to the X-axis slider 110, and a spindle head 116 affixed to the Z-axis slider 112 and supporting the spindle 114 so as to be capable of rotating about a vertical axis of rotation $C_r$. Since the machine tool 100 is configured in this manner, the spindle head 116 can be moved and positioned relative to the workpiece 8. The machine tool 100 also includes a controller 120 and an automatic tool exchange device (not illustrated).

The machine tool 100 executes tap machining as a so-called "synchronous tap machining", i.e., machining in which the rotation of the spindle 114 and the feeding in the Z-axis direction are synchronized. In the present specification, linear movement in the Z-axis direction in which the tap tool 10 executes tap machining is also referred to as advancing, and linear movement in the Z-axis direction in which the tap tool 10 is retracted from the screw hole 6 is also referred to as withdrawal. Since the axis of rotation $C_r$ of the spindle 114 and the axis of rotation $C_r$ of the tap tool are always aligned, the same reference numerals are assigned to them in the present specification.

Figure 2:
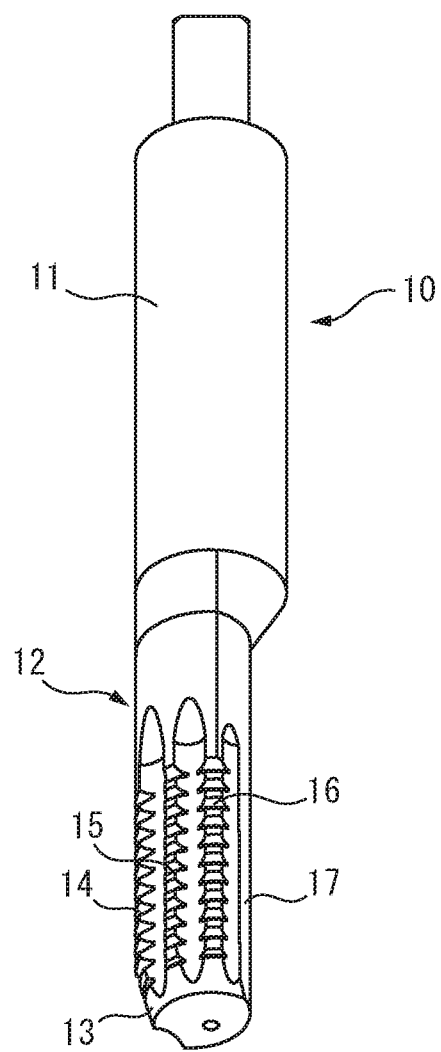
FIG. 2 is a perspective view of the tap tool according to the embodiment of the present invention.
Figure 3:
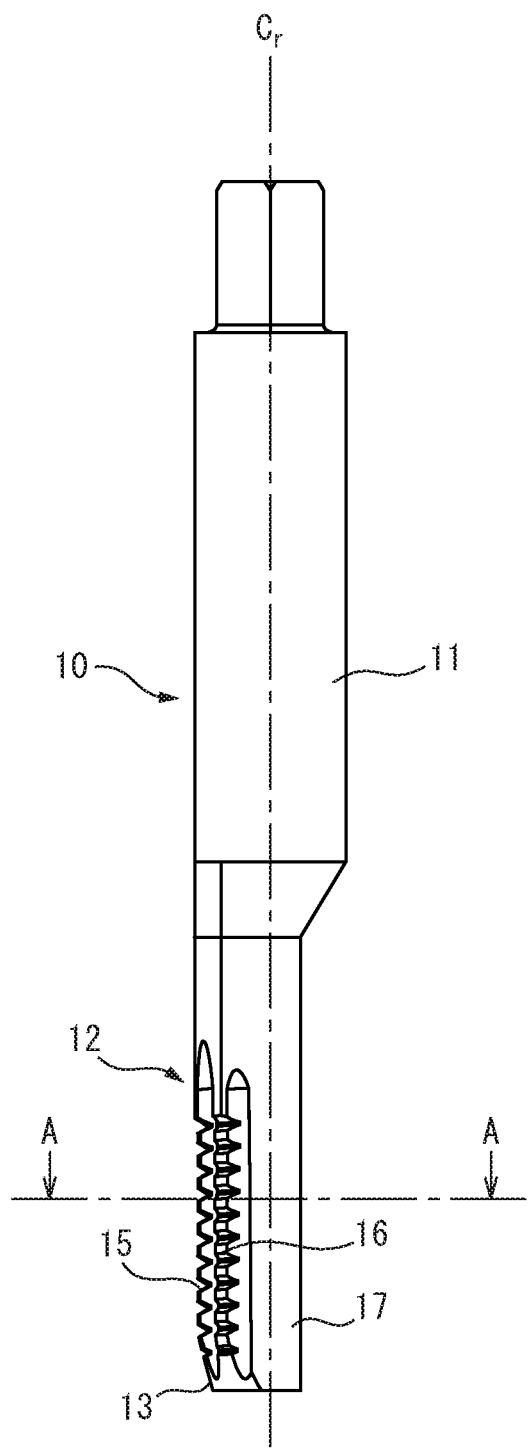
FIG. 3 is a front view of the tap tool according to the embodiment of the present invention.
Figure 4:
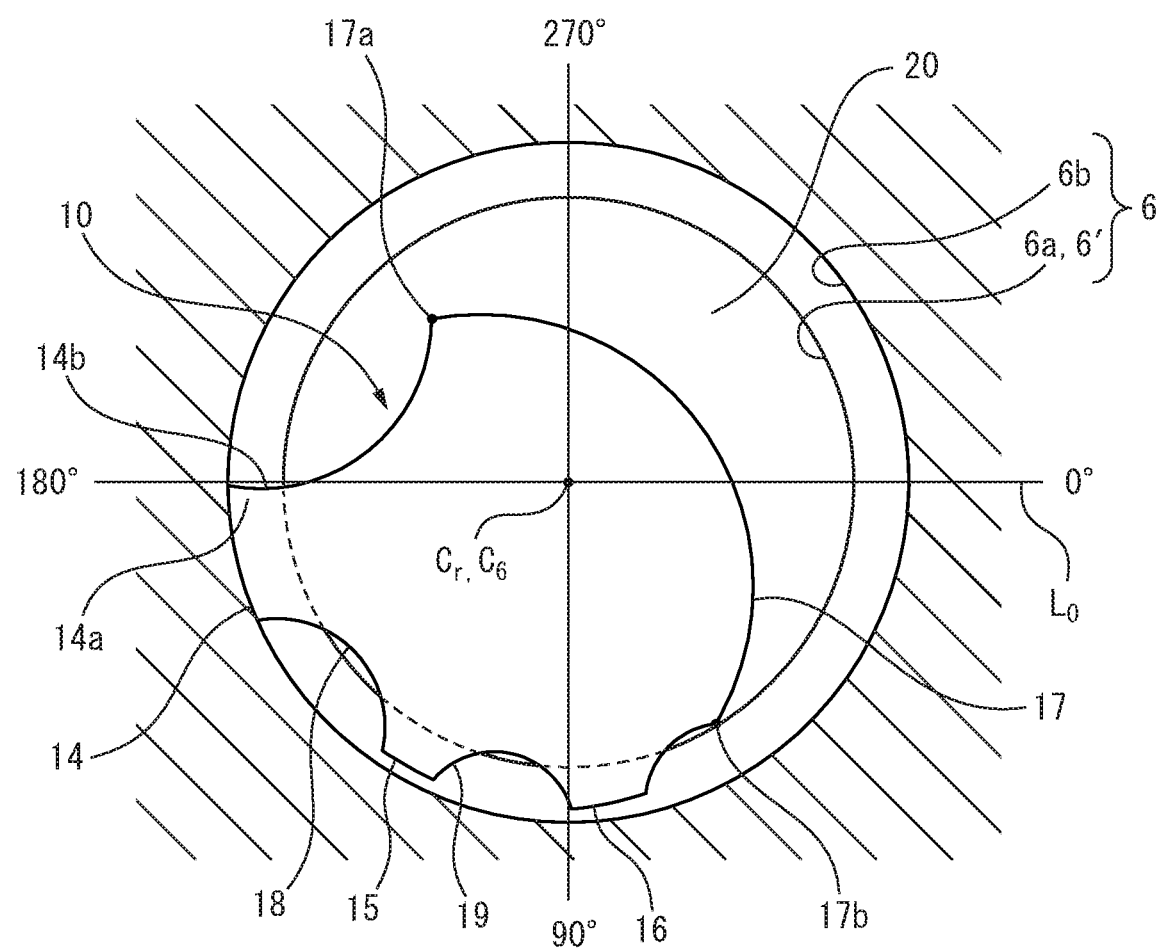
FIG. 4 is a cross-sectional view of a tap tool and a screw hole machined thereby.

A perspective view of the tap tool 10 according to the embodiment of the present invention is shown in FIG. 2, a front view is shown in FIG. 3, and a cross-sectional view taken along cutting line A-A of FIG. 3 immediately after machining is shown in FIG. 4 together with the screw hole 6. The tap tool 10 performs tap machining, i.e., machining in which a pilot hole 6 is formed into a screw hole 6, in a state in which the axis of rotation $C_r$ is aligned with the central axis $C_6$ of the pilot hole 6' provided in the workpiece. In FIG. 4, the circle represented by reference sign 6a corresponds to the inner diameters of the pilot hole 6' and the screw hole 6, and the circle represented by reference sign 6b corresponds to the root diameter of the threads of the screw hole 6, i.e., the nominal diameter of the tap tool 10.

The tap tool 10 comprises a shank section 11 on a proximal end side and a machining section 12 on a distal end side. A tapered section 13 is provided at the tip of the machining section 12. The machining section 12 is asymmetrically formed with respect to the axis of rotation $C_r$ and comprises a thread section 14 in the form of a male thread that has multiple blade sections 14a that machine the threaded grooves of screw hole 6, pad sections 15, 16 in the form of male threads which engage with the threaded grooves machined by the blade sections 14a, and a non-engagement section 17 which does not contact the pilot hole 6' or the screw hole 6 during machining. The thread section 14 has a plurality of threads arranged at predetermined pitches in the longitudinal direction, and the blade sections 14a are provided on the front sides of the respective threads in the direction of rotation. In the present embodiment, the tap tool 10 forms the threaded grooves of a triangular thread.

Figure 7:
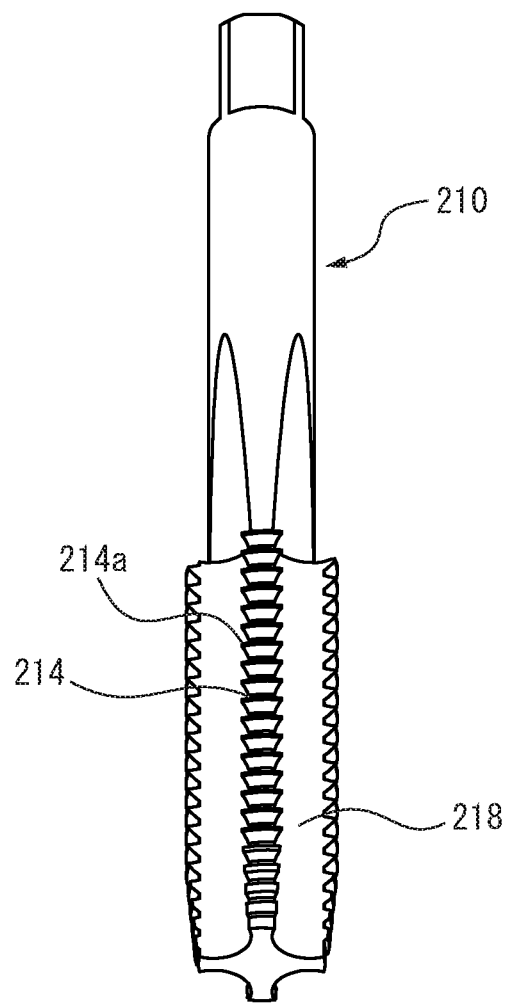
FIG. 7 is a perspective view of a conventional tap tool of the prior art.

FIG. 7 shows a conventional tap tool 210 of the prior art for comparison. The tap tool 210 has four thread sections 214 having blade sections 214a for cutting, which are divided by four longitudinal grooves 218 for cutting oil flow. As a result, in the case of the conventional tap tool 210 of FIG. 7, the four thread sections 214 are arranged at 90-degree intervals in a cross-sectional view.

Figure 5:
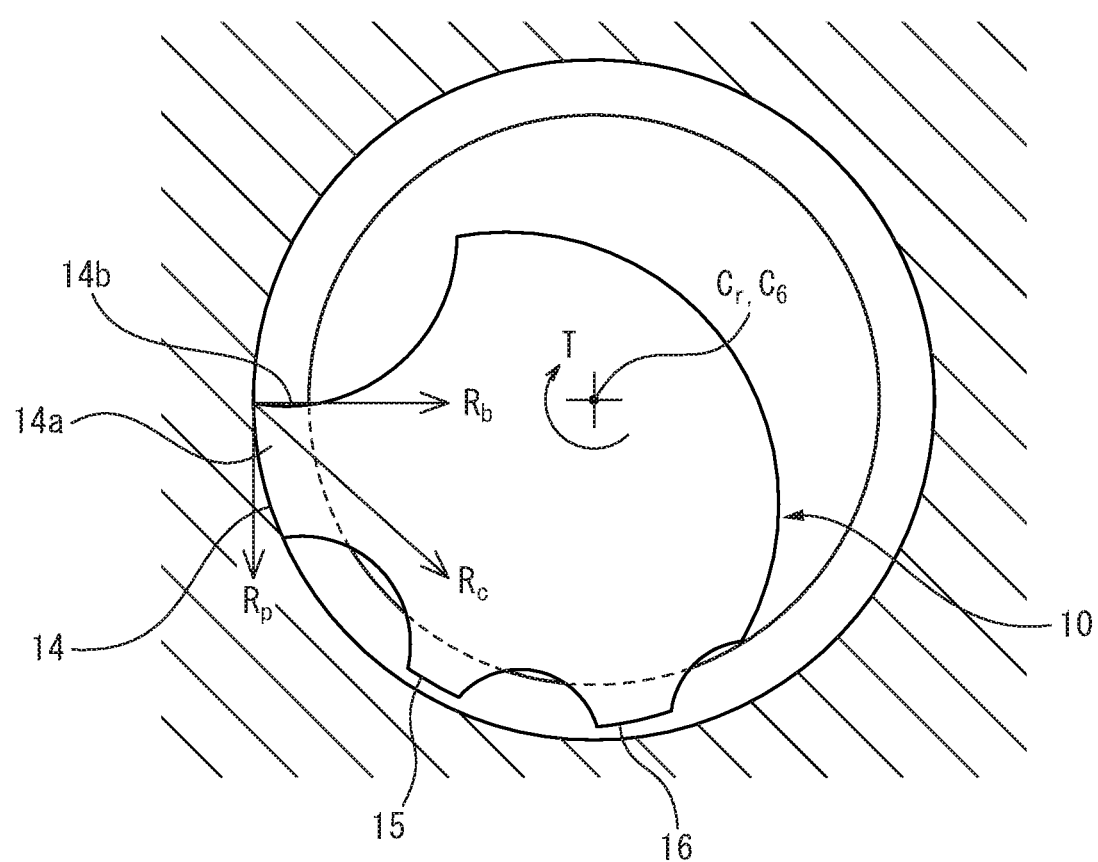
FIG. 5 is a cross-sectional view identical to FIG. 4, in which cutting resistance and the principal and back components thereof are shown.

In connection thereto, in the tap tool 10 according to the embodiment of the present invention, one thread section 14 is arranged only in the approximately 8-o'clock to 9-o'clock direction in FIG. 4. The one thread section 14 of the tap tool 10 of FIG. 4 can machine a threaded groove by means of the blade sections 14a in the same manner as the conventional thread sections 214 of, for example, FIG. 7. The principle of cutting by means of the blade sections 14a is the same as that of the prior art, and thus, the blade sections 14a each have a rake face 14b, in the same manner as the prior art. In FIG. 5, which is a cross-sectional view identical to FIG. 4, during tap machining in which rotation takes place in the direction of rotation T, the cutting resistance $R_c$ acting on the tips of the blade sections 14a of the tap tool 10 as a reaction force to the cutting force, and the back component Rb and principal component $R_p$ thereof are shown as vectors.

In FIG. 4, the tap tool 10 is formed so as to rotate clockwise. The pad sections 15, 16 are provided rearward in the direction of rotation of the thread section 14, and in the present embodiment, two pad sections, i.e., a first pad section 15 and a second pad section 16, are provided. A first groove 18 is provided between the first pad section 15 and the thread section 14, and a second groove 19 is provided between the first pad section 15 and the second pad section 16. Since the first groove 18 and the second groove 19 are formed frontward in the direction of rotation of the first pad section 15 and the second pad section 16, cutting fluid is efficiently supplied to the pad sections 15, 16 via the grooves 18, 19. This improves lubrication between the pad sections 15, 16 and the workpiece 8 and protects the tap tool 10 and the workpiece 8 from damage caused by friction of the surface of the threaded groove formed by the blade sections 14a with the pad sections 15, 16.

Male threads are formed in the pad sections 15, 16 in the same manner as the thread section 14, but the blade section 14a is not provided. Though the radius of the male threads of pad sections 15, 16 is formed so as to be slightly smaller than the radius of the male threads of thread section 14, it is formed so as to engage with the threaded groove of the screw hole 6 formed by the blade sections 14a of the thread section 14.

The pad sections 15, 16 are provided so that the cutting resistance Re generated during machining is supported by the screw hole 6. In the present embodiment, the second pad section 16 primarily fulfills this role. To this end, the direction of the cutting resistance Re extending from the blade sections 14a is toward the second pad section 16. The cutting resistance Re is transmitted to and supported by the threaded grooves of the screw hole 6 via the second pad section 16. The direction of cutting resistance Re can be changed by changing the angle of the rake face 14b.

The non-engagement section 17 is a curved smooth surface and is represented by the curve connecting points 17a and 17b in FIG. 4, which is a cross-sectional view. A space 20 is formed between the non-engagement section 17 and the inner diameter of the screw hole 6. The space 20 has a size which enables simultaneous release of the engagement between the thread section 14 and the threaded grooves of the screw hole 6 and the engagement between the first and second pad sections 15, 16 and the threaded grooves when the tap tool 10 shifts from the state of FIG. 4 in the direction and by a distance indicated by arrow S orthogonal to the axis of rotation $C_r$, i.e., when it shifts to the position shown in FIG. 6. The size of the space 20 is formed so as to be slightly larger with a margin. During cutting, the space 20 serves as a path for supplying cutting fluid to the blade sections 14a and a path for discharging swarf generated by the cutting, which has the effect of improving the quality of the machined surface and extending tool life.

Figure 6:
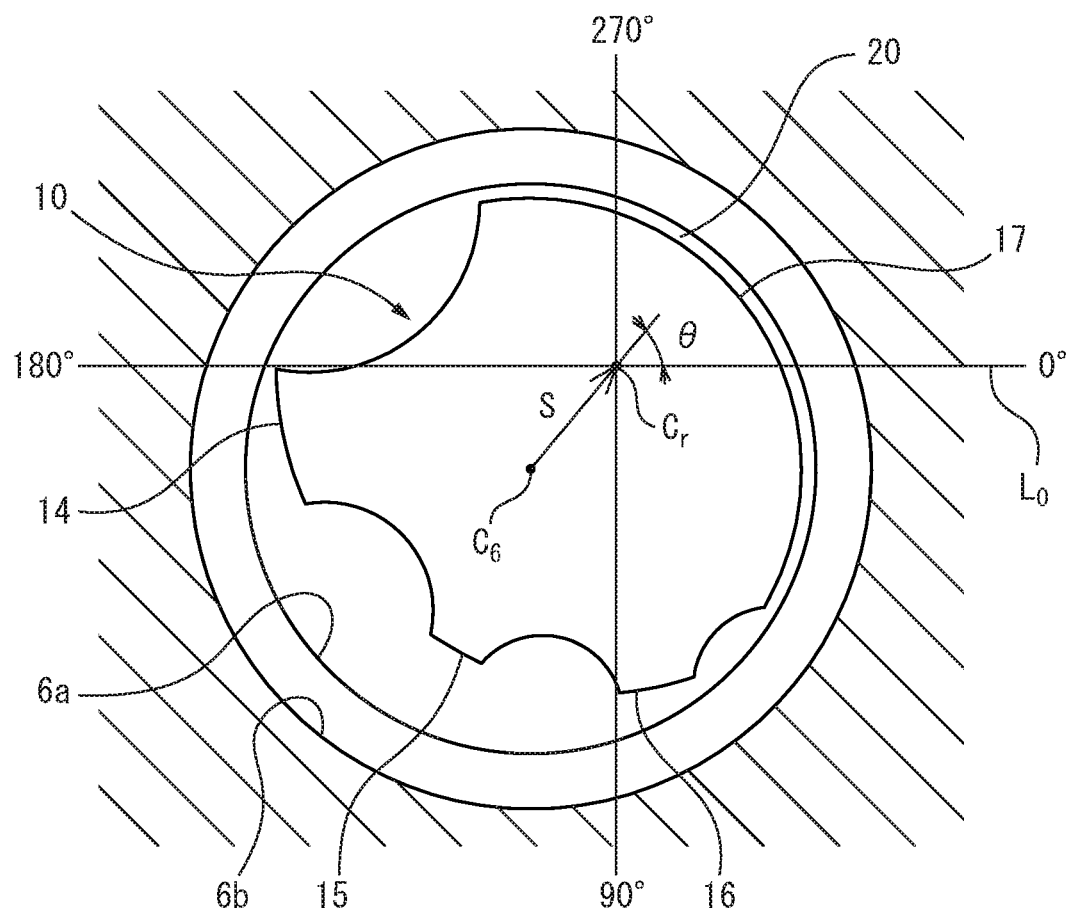
FIG. 6 is a cross-sectional view of a tap tool and a screw hole, in which a state in which the tap tool has shifted from the state of FIG. 4 is shown.

As shown in FIG. 6, the tap tool 10 in which the thread section 14, pad sections 15,16, and the threaded grooves have been released from engagement can be retracted from the screw hole 6 by withdrawal in the direction of the axis of rotation. The retraction of the tap tool 10 does not include a rotational motion, unlike the prior art, whereby the tap tool 10 can be retracted at high speed.

In the machine tool 100 of the present example, a reference line (hereinafter referred to as the "origin line") Lo of the rotation angle of the spindle 114 at 0 degrees extends in the direction of 3-o'clock in FIGS. 4 and 6. In FIGS. 4 and 6, the rotation angle (hereinafter, also referred to as the "phase angle") of the tap tool 10 with respect to the origin line Lo is exemplified at 180-degrees as the phase angle of the blade sections 14a. The phase angle of the tap tool 10, which is stationary after machining, is different for each screw hole 6 because the rotation speed of the tap tool 10 required for machining is different when the depth of the screw hole 6 differs. Thus, the shift direction of the tap tool 10 with respect to the origin line Lo of the spindle 114 also differs for each screw hole 6. In order to obtain the shift direction, in the present embodiment, the tap tool 10 is set to a predetermined phase angle with respect to the origin line Lo of the spindle 114 when the tap tool is positioned at the machining start point (not illustrated). The phase angle of the tap tool 10 after machining is calculated by the controller 120 from the information of an encoder of a spindle motor, and the shift direction, i.e., the direction of θ-degrees from the origin line Lo in the example of FIG. 6 is calculated based on the calculated phase angle of the tap tool 10. Conversely, the required shift amount is determined by the cross-sectional shape of the tap tool 10, and is stored in advance in the controller 120.

An example of the tap machining performed by the tap tool 10 according to the embodiment of the present invention and a vertical machine tool as shown in FIG. 1 will be described below.

First, the tap tool 10 is positioned at the machining start point. Specifically, the axis of rotation $C_r$ of the spindle 114 of the machine tool having the tap tool 10 mounted thereon and the central axis $C_6$ of the pilot hole 6' provided in the workpiece are aligned, and the tip of the tap tool 10 is positioned at the machining start point at a predetermined height in the Z-axis direction. At this time, the phase angle of the tap tool 10 with respect to the origin line Lo of the spindle 114 is set to a predetermined value.

Next, synchronous tap machining is performed by synchronizing the rotational speed of the spindle 114 and the feed rate in the Z-axis direction in accordance with the pitch of the thread. When the tap tool 10 moves in the Z-axis direction by a predetermined distance and reaches the commanded screw depth, the rotation and feeding of the spindle 114 are stopped. As a result, the pilot hole 6' of the workpiece is formed into the screw hole 6.

Next, the tap tool 10 is shifted in a specific direction orthogonal to the axis of rotation $C_r$. The specific direction is determined based on the phase angle of the tap tool 10 determined from the information of the encoder of the spindle motor, and is the direction represented by arrow S in the example of FIG. 6. A value registered in advance in the controller 120 is used as the shift amount. By this step, the engagement between the thread section 14 or pad sections 15, 16 of the tap tool 10 and the threaded groove of the screw hole 6 is completely released.

Next, the tap tool 10 is retracted upward to the machining start point without rotation. The feed rate of the spindle 114 in the Z-axis direction at this time can be made two times or more greater than the feed rate at the time of machining, i.e., at the time of advancement.

As a result of the foregoing, tap machining of one screw hole 6 is completed.

According to the present invention, the space 20 is formed between the non-engagement section 17 of the tap tool 10 and the inner diameter of the screw hole 6, and the space 20 has a size with which the engagement between the thread section 14 or pad sections 15, 16 and the threaded groove can be released when the tap tool 10 moves in the direction orthogonal to the axis of rotation $C_r$. Thus, after machining, the tap tool 10, which has released the engagement with the threaded groove of the screw hole 6, can be retracted from the screw hole 6 at high speed in the direction of the axis of rotation without rotation. Due to the effect of retracting at high speed, the machining time, including retraction time of the tap tool 10, can be reduced by approximately 40% as compared with the case in which the conventional tap tool 210 of the prior art is used.

According to the present invention, since the cutting resistance $R_c$ is supported by the screw hole 6 via the second pad section 16, the deflection that occurs in the tap tool 10 based on the cutting resistance $R_c$ is negligible, and as a result, machining accuracy is the same as when the conventional tap tool 210 of the prior art is used.

Other Embodiments

Though the tap tool 10 of the embodiment described above comprises two pad sections 15, 16, the number of pad sections is not limited to two, and thus, a tap tool 10 comprising, for example, one or three pad sections can also be used in the present invention.

Though the tap tool 10 of the embodiment described above comprises a first groove 18 between the first pad section 15 and the thread section 14, a groove need not be provided between the pad section and the thread section 14, and thus, a tap tool in which a pad section formed so as to be continuous with the thread section 14 can also be used in the present invention.

In the embodiment described above, though the pad sections 15, 16 have radii which are slightly smaller than the radius of thread section 14, an embodiment of the tap tool 10 in which the radii of the pad sections are equal to the radius of the thread section 14 can also be used in the present invention.

DESCRIPTION OF REFERENCE SIGNS

6 Screw Hole
6' Pilot Hole
10 Tap Tool
14 Thread Section
14a Blade Section
14b Rake Face
15 First Pad Section
16 Second Pad Section
17 Non-Engagement Section
20 Space
$C_6$ Central Axis
$C_r$ Axis Of Rotation
$R_c$ Cutting Resistance

The invention claimed is:

1. A tap tool which has an axis of rotation and which machines a pilot hole provided in a workpiece into a screw hole in a state in which a central axis of the pilot hole and the axis of rotation are aligned, the tap tool comprising:
   a thread section, formed asymmetrically relative to the axis of rotation, and having a blade section configured to machine a threaded groove of the screw hole,
   a pad section positioned rearward of the thread section in the direction of rotation, wherein the pad section does not have a blade portion, and is configured to engage with the threaded groove machined by the blade section during machining of the threaded groove so as to support a cutting resistance acting on the thread section by frictionally contacting the surface of the threaded groove, and
   a non-engagement section configured to form a space between itself and the screw hole in a cross-sectional view in which the axis of rotation and the central axis of the screw hole are aligned,
   wherein the space has a size which enables simultaneous release of engagement between the thread section and the threaded groove and engagement between the pad section and the threaded groove when the tap tool shifts in the screw hole in a direction orthogonal to the axis of rotation from a state in which the axis of rotation and the central axis of the screw hole are aligned.

2. The tap tool according to claim 1, wherein the blade section has a rake face and the rake face is formed so that a cutting resistance generated during tap machining is supported by the threaded groove via the pad section.

3. The tap tool according to claim 1, wherein the pad section is composed of a first pad section and a second pad section, and
   the tap tool comprises:
      a first groove provided between the thread section and the first pad section, and
      a second groove provided between the first pad section and the second pad section.

4. The tap tool according to claim 1, installed on a spindle of a machining center.

5. A tap machining method, comprising:
   aligning an axis of rotation of a spindle of a machine tool on which a tap tool is installed and a central axis of a pilot hole provided in a workpiece, where the pilot hole is machined by the tap tool into a screw hole; where the tap tool includes a thread section, formed asymmetrically relative to the axis of rotation, and having a blade section configured to machine a threaded groove of the screw hole, a pad section positioned rearward of the thread section in the direction of rotation, wherein the pad section does not have a blade portion, and is configured to engage with the threaded groove machined by the blade section during machining of the threaded groove so as to support a cutting resistance acting on the thread section by frictionally contacting the surface of the threaded groove, a non-engagement section configured to form a space between itself and the screw hole in a cross-sectional view in which the axis of rotation and the central axis of the pilot hole are aligned, and wherein the space has a size which enables simultaneous release of engagement between the thread section and the threaded groove and engagement between the pad section and the threaded groove when the tap tool shifts in the screw hole in a direction orthogonal to the axis of rotation from a state in which the axis of rotation and the central axis of the pilot hole are aligned;
   performing tap machining on the pilot hole by advancing the tap tool in the direction of the axis of rotation while rotating the tap tool;
   shifting the tap tool in the direction orthogonal to the axis of rotation so as to release engagement between the thread section of the tap tool and the threaded groove; and
   withdrawing the tap tool in the direction of the axis of rotation without rotating the tap tool.

6. The tap machining method according to claim 5, wherein the step of withdrawing the tap tool in the direction of the axis of rotation occurs at a movement speed of the tap tool that is higher than a movement speed of the tap tool during advancing the tap tool.

7. The tap machining method according to claim 5, further comprising, after the step of performing tap machining, calculating a shift direction of the tap tool in the step of shifting the tap tool based on a phase angle about the axis of rotation.

* * * * *